United States Patent

[11] 3,616,199

[72] Inventor David S. Breslow
 Wilmington, Del.
[21] Appl. No. 862,520
[22] Filed Sept. 30, 1969
[45] Patented Oct. 26, 1971
[73] Assignee Hercules Incorporated
 Wilmington, Del.

[54] REINFORCING PROCESS
 6 Claims, No Drawings
[52] U.S. Cl. .................................................. 161/231,
 260/349
[51] Int. Cl. ................................................. B32b 27/06,
 C07c 143/56
[50] Field of Search ........................................... 161/231,
 233; 260/349

[56] References Cited
 UNITED STATES PATENTS
 2,254,191 8/1941 Roblin .......................... 260/349
 3,298,975 1/1967 Feild et al. .................... 260/349

Primary Examiner—Douglas J. Drummond
Attorney—Charles L. Board

ABSTRACT: The addition of fibrous polyester reinforcing material to rubber stock can be improved by treating the fibrous material with a polysulfonyl azide having the formula $$R-(SO_2N_3)_x$$

where R is a polyvalent organic radical, such as an aliphatic, cycloaliphatic or aromatic radical and $x$ is an integer greater than 1. Vulcanized rubber tires reinforced with treated polyester tire cord are disclosed.

REINFORCING PROCESS

This invention relates to a process of improving the adhesion of fibrous polyester reinforcing material to rubber stock and to the products so produced. In particular, this invention relates to a process of improving the adhesion of polyester fiber, including yarn, fabric and cord to rubber stock by treatment of the fiber with a polysulfonyl azide and to the products so produced.

It is known to reinforce rubber products with various types of reinforcing materials such as rayon, nylon, glass, and metal fibers. It is also known that polyester fibers are advantageous because of their higher initial modulus, low elongation, greater strength retention under humid conditions, and other improved properties. However, development in the use of polyester fiber has been slowed by the problems of achieving good adhesion between the fiber and rubber stock.

Now, in accordance with this invention it has been found that polyester fiber, including yarn, fabric, cord and the like, having good adhesion to vulcanized rubber stock can be prepared by modifying the fiber with a polysulfonyl azide as described hereinafter. The fiber-to-rubber adhesion can be further improved for some usages if an adhesive coating is applied to the modified fiber. The coating frequently used in a dispersion of a phenol-aldehyde condensation copolymer (i.e. resin) and a vinylpyridine containing rubber polymer latex. The modified polyester reinforcing material of this invention can be used in any type of rubber tire, including automobile, truck, tractor, and aircraft tires, as well as in rubber belting and rubber hose where low elongation, strength and dimensional stability are important.

The polyester fibers useful in the instant invention are made from the well-known polyesters obtained by reacting glycols, such as ethylene glycol, propylene glycol, cyclohexanedimethanol, and the like with dicarboxylic acids, such as terephthalic acid, isophthalic acid, stilbene dicarboxylic acid, and the like. In addition to the yarn, fabric or cord made from polyester fibers, combinations or blends of polyester fibers with, for example, cotton or rayon fibers can be used in this invention. Improved adhesion of the polyester fibers to rubber can be obtained by the process of this invention, no matter what the physical form of these fibers. However, as a practical matter the fibers so treated generally will have been previously plied or twisted into yarn or cord or may have been woven or knit into fabrics. Thus, this process is not limited to the treatment of tire cord. Various methods for the preparation of yarn, cord, fabrics and other woven or unwoven fiber substrates are well known to those skilled in the art.

The polysulfonyl azides used to treat the polyester fiber in accordance with this invention are represented by the formula $$R\text{-}(SO_2N_3)_x \; X$$

where R is a polyvalent organic radical selected from aliphatic, cycloaliphatic, and aromatic radicals and $x$ is an integer greater than 1, preferably from about 2 to 5. In preferred embodiments of this invention R will be an organic radical selected from the group consisting of radicals derived by the removal of two or more hydrogen atoms from alkanes, such as, for example, ethane, propane, butane, isobutane, pentane and its isomers, hexane and its isomers, octane and its isomers, decane and its isomers, dodecane and its isomers, octadecane and its isomers, and the like; cycloalkanes, such as, for example, cyclopropane, cyclobutane, cyclopentane, cyclohexane, cyclooctane, and the like; alkylcycloalkanes such as, for example, ethylcyclohexane, methylcyclobutane, and the like; aromatic hydrocarbons, such as, for example, benzene, naphthalene, biphenyl, and the like; alkyl-substituted arylenes, such as, for example, toluene, ethylbenzene, o-, m- and p-xylene, o-, m- and p-diethylbenzene and the like; diarylalkylenes, such as, for example, diphenylmethane, 1,2-diphenylethane, 1,1-diphenylpropane, 1,3-diphenylpropane, 2,2-diphenylpropane, and the like; dialkylcycloalkanes, such as, for example, 1,2-, 1,3- and 1,4-dimethylcyclohexane, 1,2- and 1,3-dimethylcyclopentane and the like; and the alkyloxyalkanes, aryloxyarylenes, alkaryloxyarylenes, alkaryloxyalkarylenes, aralkyloxyalkanes, aralkyloxyaralkanes, and the like; as well as the corresponding thio- and sulfonyl compounds, specific examples of which include diethyl ether, propyl butyl ether, diphenyl ether, oxy-bis(p-methyl benzene), dibenzyl ether, diethyl sulfide, diphenyl sulfide, dibenzyl sulfide, dibutyl sulfone, and the like compounds; and the foregoing compounds with fluoro, chloro, bromo, and iodo substituents. It will of course, be obvious to those skilled in the art that R can contain other functional groups, which are substantially inert to the reactions in which these compounds are used, such as esters, amides, etc.

Typical compounds represented by the foregoing generic formula include 1,9-nonanedisulfonyl azide
1,5-pentanedisulfonyl azide
1,10-decanedisulfonyl azide
1,3-benzenedisulfonyl azide
2,7-naphthalenedisulfonyl azide
1-octyl-2,4,6-benzenetrisulfonyl azide
4,4′-diphenylmethanedisulfonyl azide
4,4′-diphenyletherdisulfonyl azide Included with the above typical compounds are the mixed isomers of chlorinated aliphatic polysulfonyl azides, such as the mixed isomers of the $C_{12}$ to $C_{13}$ aliphatic hydrocarbons substituted with an average of 1 chlorine and 2.5 sulfonyl azides per aliphatic chain.

The first step in the process of this invention is the modification of polyester fiber by treatment with a polysulfonyl azide. This is accomplished by contacting the fiber with the polysulfonyl azide compound as for example, by dipping, spraying, brushing, or running it over a coated roll with a dispersion or solution of the polysulfonyl azide in a suitable liquid. Exemplary of suitable organic solvents for the polysulfonyl azides are methylene chloride, trichloroethylene, methyl ethyl ketone, benzene and toluene. Water can also be used, with the polysulfonyl azides being applied as an aqueous suspension, emulsion or dispersion. In the next step of the process, the thus treated fiber is heated to a temperature above the decomposition point of the sulfonyl azide groups resulting in surface modification of the fiber. This temperature will in general be from about 120° C. to about 250° C. Various amounts of the polysulfonyl azide treating agents can be used. The optimum amount will depend upon the amount of modification desired, and the specific polysulfonyl azide compound used. In general, the amount added based on the fiber will be from about 0.1 to about 5.0 percent by weight. Next, the modified fibrous material may be coated with a standard industrial coating, or adhesive, which is compatible with the rubber in which the fibrous reinforcing material is to be embedded. As stated above, the coating is generally a mixture of a phenol-aldehyde resin and a vinylpyridine polymer latex. In all cases the exact selection of the polymer latex components will be made to achieve compatibility with the rubber used in the final fiber-to-rubber composite. Preferably, the phenol-aldehyde resin will be prepared from resorcinol and formaldehyde, although other phenols such as hydroxybenzene, para-cresol, and pyrogallol can also be used. The mole ratio of phenolic compound to aldehyde in the phenol-aldehyde resin can be varied between about 1:1.02 to about 1:5. The phenol-aldehyde resin will generally be aged for a period of from about 0.5 to about 6 hours before mixing with the vinylpyridine polymer latex. The said aging can be carried out at room temperature or elevated temperatures. For use with natural rubber and styrene-butadiene rubber the vinylpyridine polymer latex will preferably be a terpolymer of a vinylaryl monomer, a diene monomer, and a vinylpyridine monomer. The vinylaryl monomer will preferably be styrene, although other monomers such as vinyltoluene can be used. The diene monomers which can be used in preparing the polymer latex are open chain conjugated diolefins, including for example, 1,3-butadiene, isoprene, 2,3-dimethyl-1,3-butadiene, 1,2-diethyl-1,3-butadiene, and piperylene. The vinylpyridine monomers most useful in preparing the polymer latex are alpha-vinylpyridine, 5-ethyl-2-vinylpyridine, and 2-methyl-5-vinylpyridine, although other monomers such as 5-butyl-1-vinylpyridine, 5-heptyl-2-vinylpyridine, 6-methyl-2-vinylpyridine, 4,6-dimethyl-2-vinylpyridine, and 2-methyl-4-vinylpyridine can be used. The vinylpyridine content of the terpolymer is usually from about 5 percent to about 25 percent, the vinylaryl monomer content from about 5 percent to about 35 percent and the diene monomer content from about 50 percent to about 85 percent. The rubber polymer latex can be admixed with the phenol-aldehyde resin in ratios of between about 2:1 and about 10:1. Following the mixing of the two ingredients the pH will generally be adjusted to about 9.5 to about 10.5 using an inorganic base such as ammonium hydroxide.

The modified fibrous material can be coated with the conventional coating uniformly by dipping, spraying, running the material over a coated roll, or other conventional procedure. The coating will amount to from about 2 percent to about 10 percent by weight of the material. The coated material will then be cured for a short time such as from about 1 to about 10 minutes at a temperature of between about 250° F. and about 450° F. The cured coating is a hard polymer which is very adherent to the modified fibrous material and produces excellent adhesion between the modified material and conventionally vulcanized rubber. It may be desirable in certain cases, to omit the latex coating, thereby directly embedding the modified polyester fibrous material in a vulcanizable rubber stock and curing to obtain a reinforced rubber product. Such products reinforced with modified polyester fibrous material are superior to products reinforced with nonmodified polyester fibrous material, but exhibit a proportionate decrease in adhesive strength over those reinforced with modified fibrous material and coated with the above-described coating composition.

In the final step of the process of this invention the modified polyester fibrous material is embedded in the vulcanizable rubber stock to be reinforced and then the stock is vulcanized. Conventional vulcanization temperatures in the order of from about 275° F. to about 350° F. can be used. The rubber stock in which the modified polyester can be embedded includes natural rubber and synthetic rubbers such as styrenebutadiene rubber, ethylenepropylenediene terpolymer rubbers, ethylenepropylene copolymer rubbers, polybutadiene, polyisoprene, and mixtures or blends thereof with suitable fillers, pigments, antioxidants, and cross-linking (i.e. vulcanizing) agents such as sulfur, dicumyl peroxide, and the like.

The following examples will serve to illustrate the invention, all parts and percentages being by weight unless otherwise indicated.

EXAMPLE 1

Poly(ethylene terephthalate) tire cord 1,000 denier and three-ply under about 500 grams of tension is passed twice through a trough containing a 5 percent solution of 1,3-benzenedisulfonyl azide in trichloroethylene. The cord is next passed through two ovens in series at 200° F. and 400° F. Residence times in the ovens are 65 and 54 seconds respectively. The cord dip pickup is approximately 0.9 percent by weight.

The modified cord is next dipped in a resin latex prepared as follows: To a solution of 0.24 part of sodium hydroxide in 192.8 parts of water is added 8.8 parts of resorcinol with continued stirring until a complete solution is achieved. Then 12.2 parts of 37 percent formaldehyde is added. The solution is aged for approximately 5 hours at about 75° C. and then added slowly to a mixture of 48 parts water and 195 parts of a commercial latex comprising a terpolymer of styrene, butadiene and vinylpyridine. The monomers being present in a ratio of approximately 15:70:15. The mixture is stirred slowly for 15 minutes and its pH adjusted to 10.3 using concentrated ammonium hydroxide. The resulting gray-violet latex contains approximately 20 percent solids. The disulfonyl azide modified cord is passed twice through a trough of the above-described latex under a tension of 500 grams and then dried and cured for 54 seconds at a temperature of 430° F.

The thus-coated cord is then vulcanized with a rubber tire stock in the form of 3/8-inch H-specimens. The rubber tire stock has the following formulation:

| Compounds | Parts |
|---|---|
| Natural rubber (smoked sheet) | 80 |
| Styrene butadiene rubber | 20 |
| Semireinforcing furnace black | 25 |
| Zinc Oxide | 5 |
| Stearic Acid | 2 |
| Polytrimethyl dihydroquinoline | 1 |
| Heavy pine tar | 0.5 |
| Benzothiazoyl disulfide | 1 |
| Tetramethyl thiuram disulfide | 0.1 |
| Sulfur | 2.6 |

The test specimens are cured for 45 minutes at a temperature of 307° F. After several hours conditioning at room temperature the H-specimens are tested according to the procedure of ASTM-D-2138-62T. An average (6 test specimens) of 31 pounds is required to overcome the tire cord-rubber adhesion. A control specimen treated exactly the same as above except for the disulfonyl azide treatment gives an average of 17 pounds required to overcome the tire cord-rubber adhesion.

EXAMPLE 2

Vulcanized rubber tire stock is reinforced with poly(ethylene terephthalate) tire cord exactly as described in example 1 except for the dip in the resorcinol-formaldehye latex. Test specimens are prepared and tested exactly as described in example 1. Those specimens treated with the disulfonyl azide require substantially more pounds of force to overcome the tire cord-rubber adhesion than do the control specimens.

EXAMPLE 3

A conventional rubber tire stock is reinforced with modified and coated polyester tire cord exactly as described in example 1 except that in place of the 1,3-benzenedisulfonyl azide is used 1,9-nonanedisulfonyl azide. The cord's sulfonyl azide dip pickup is 1.8 percent by weight. The resulting product is tested as described in example 1. An average (6 test specimens) of 38 pounds is required to overcome the tire cord-rubber adhesion. The control gives an average of 17 pounds required to overcome the tire cord-rubber adhesion.

What I claim and desire to protect by Letters Patent is:

1. In a process of adhering fibrous polyester reinforcing material to rubber stock the improvement of first contacting said fibrous material with a polysulfonyl azide having the formula

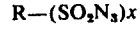

$$R-(SO_2N_3)x$$

wherein R is a polyvalent organic radical and $x$ is an integer greater than 1 and heating the thus-contacted fibrous material at a temperature sufficient to substantially decompose the sulfonyl azide groups on the polysulfonyl azide.

2. The process of claim 1 wherein the polysulfonyl azide is 1,3-benzenedisulfonyl azide.

3. The process of claim 1 wherein the polysulfonyl azide is 1,9-nonanedisulfonyl azide.

4. The process of claim 1 wherein the fibrous polyester reinforcing material is poly(ethylene terephthalate) tire cord.

5. A fibrous polyester reinforcing material modified by reaction with a polysulfonyl azide having the formula $$R-(SO_2N_3)x$$

wherein R is a polyvalent organic radical, and $x$ is an integer greater than 1.

6. A vulcanized rubber product reinforced with fibrous polyester reinforcing material said material having been first modified by heating with a small amount of a polysulfonyl azide having the formula $$R-(SO_2N_3)x$$

wherein R is a polyvalent organic radical, and $x$ is an integer greater than 1.

* * * * *

PO-1050
(5/69)

UNITED STATES PATENT OFFICE
CERTIFICATE OF CORRECTION

Patent No. 3,616,199          Dated October 26, 1971

Inventor(s) David S. Breslow    (Case 51)

It is certified that error appears in the above-identified patent and that said Letters Patent are hereby corrected as shown below:

Column 1, line 24; "in" should read --is--

Column 1, (formula) of printed patent;

$"R-(SO_2N_3)_xX"$ should read $--R-(SO_2N_3)_x--$

Column 3, line 4; "5-butyl-1-" should read

-- 5-butyl-2- --

Signed and sealed this 18th day of April 1972.

(SEAL)
Attest:

EDWARD M.FLETCHER,JR.        ROBERT GOTTSCHALK
Attesting Officer               Commissioner of Patents